United States Patent
Bierhuizen

(10) Patent No.: US 6,587,268 B1
(45) Date of Patent: Jul. 1, 2003

(54) OPTICAL ELEMENT AND PROJECTION SYSTEM

(75) Inventor: Serge J. A. Bierhuizen, Wilsonville, OR (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 133 days.

(21) Appl. No.: 09/695,580

(22) Filed: Oct. 24, 2000

(30) Foreign Application Priority Data

Oct. 28, 1999 (EP) .............................. 99203546

(51) Int. Cl.⁷ ................................ G02B 5/30
(52) U.S. Cl. .................... 359/497; 359/487; 359/359; 359/361; 359/500; 349/5; 353/20; 362/19
(58) Field of Search ................. 359/497, 487, 359/496, 498, 502, 359, 361, 500; 349/5, 96, 104, 105; 353/20, 55; 362/19

(56) References Cited

U.S. PATENT DOCUMENTS 5,729,306 A * 3/1998 Miyake et al. ............... 349/9
5,764,412 A   6/1998 Suzuki et al. ............... 359/487

FOREIGN PATENT DOCUMENTS

DE   0 957 387 A  * 11/1999
EP   10170869       6/1998
EP   0957387  A1   11/1999

* cited by examiner

Primary Examiner—Audrey Chang

(57) ABSTRACT

An optical element suitable for separating and converting directions of polarization, comprising polarization-separating members arranged in a row which extends transversely to an optical principal axis of the optical element for separating incident light from a light source into transmitted light having a first linear direction of polarization and reflected light having a second linear direction of polarization which, on a side facing the light source, is orthogonal to the first direction of polarization, which polarization-separating members have faces extending at an angle to the optical principal axis, while each polarization-separating member has a thickness in the direction of the optical principal axis and a width in a direction transverse to the optical principal axis. The optical element further includes polarization-converting members arranged on a side of the polarization-separating members that faces away from the light source for converting either one of said first or said second direction of polarization into said second or said first direction of polarization. Polarization-separating members arranged proximate to the optical principal axis have a width which is different from the width of polarization-separating members spaced apart from the optical principal axis. The spacing between the optical axes of the polarization-separating members arranged proximate to the optical principal axis is different from the spacing between the optical axes of the polarization-separating members spaced apart from the optical principal axis.

9 Claims, 2 Drawing Sheets

OPTICAL ELEMENT AND PROJECTION SYSTEM

FIELD OF TECHNOLOGY

Figure 1:
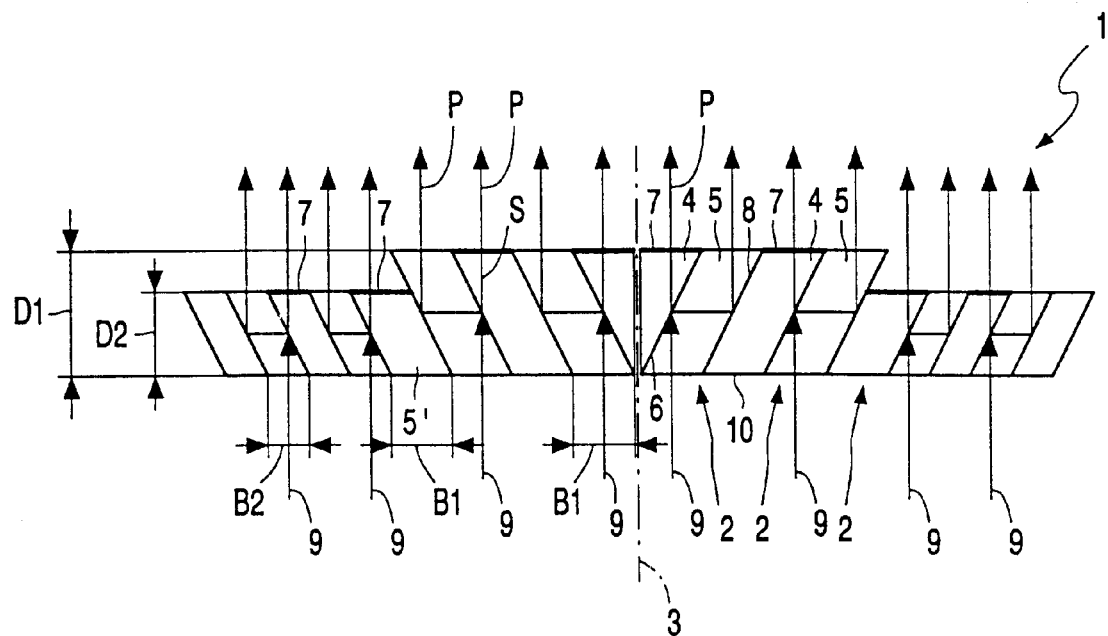

The invention relates to an optical element suitable for separating and converting directions of polarization, comprising polarization-separating members arranged in a row extending transversely to an optical principal axis of the optical element for separating incident light from a light source into transmissive light having a first linear direction of polarization and reflective light having a second linear direction of polarization which is orthogonal to the first direction of polarization on a side facing the light source, said polarization-separating members having faces extending at an angle to the optical principal axis, and each polarization-separating member having a thickness in the direction of the optical principal axis and a width in a direction transverse to the optical principal axis, the optical element being further provided with polarization-converting members located on a side of the polarization-separating members remote from the light source for converting the first or the second direction of polarization into the second or the first direction of polarization.

The invention also relates to a projection system.

BACKGROUND AND SUMMARY

In such an optical element, which is known from United States patent U.S. Pat. No. 5,764,412, the optical axes, extending parallel to the optical principal axis, of the incident light of juxtaposed polarization-separating members are spaced regularly far apart. Spaced apart from the optical principal axis, a polarization-separating member is located on both sides of this axis, which member has a width of twice the width of the other polarization-separating members so as to ensure that, on a side remote from the light source, the optical axes of the exiting light of the polarization-separating members are spaced equally far apart as the optical axes of the incident light.

A drawback of the known optical element is that it is only suitable for separating and converting incident light beams extending parallel along the optical axes, which light beams are juxtaposed at regular distances, so that it is not suitable for applications in which the light beams are spaced apart at different distances.

It is an object of the invention to provide an optical element in which the drawbacks of the known optical element are obviated.

In the optical element according to the invention, this object is achieved in that polarization-separating members located proximate to the optical principal axis have a different width than polarization-separating members spaced apart from the optical principal axis, the optical axes of the polarization-separating members located proximate to the optical principal axis being located at a different distance from each other than the optical axes of the polarization-separating members spaced apart from the optical principal axis.

The width of the polarization-separating members is adapted to the desired mutual distance between the optical axes of the incident light beams. In this way, the optical element is suitable for use in, inter alia, an LCD projector which is provided with a light source, a light modulation panel and two interpositioned integrator plates, in which the light beams coming from the light source and exiting from the integrator plates are spaced apart at different distances.

An embodiment of the optical element according to the invention is characterized in that the polarization-separating members located proximate to the optical principal axis have a larger width than the polarization-separating members spaced apart from the optical principal axis.

Such an optical element is suitable for use in, inter alia, the above-mentioned LCD projector, in which the entering light beams on a side remote from the optical principal axis are located closer together than those proximate to the optical principal axis.

A further embodiment of the optical element according to the invention is characterized in that polarization-separating members located proximate to the optical principal axis have a larger thickness than polarization-separating members spaced apart from the optical principal axis.

Since the thickness of each polarization-separating member, desired at a given width, can thus be determined, a minimum quantity of optical material is sufficient to manufacture the optical element.

Another embodiment of the optical element according to the invention is characterized in that all polarization-separating members have the same thickness.

Both the side facing the light source and the side remote from the light source can then be easily processed to form a plane surface.

Yet another embodiment of the optical element according to the invention is characterized in that all polarization-separating members are co-planar on a side facing the light source.

Such an optical element can easily be secured to, for example, an integrator plate located between the light source and the optical element.

A further embodiment of the optical element according to the invention is characterized in that the polarization-separating members located on both sides of the optical principal axis extend alongside each on faces intersecting each other on a side remote from the light source.

In this way, the reflecting light passing through a polarization-separating member is incident on a member having the same or a larger width and/or thickness.

These and other aspects of the invention are apparent from and will be elucidated with reference to the embodiments described hereinafter.

DESCRIPTION OF THE DRAWING FIGURES

Figure 2:
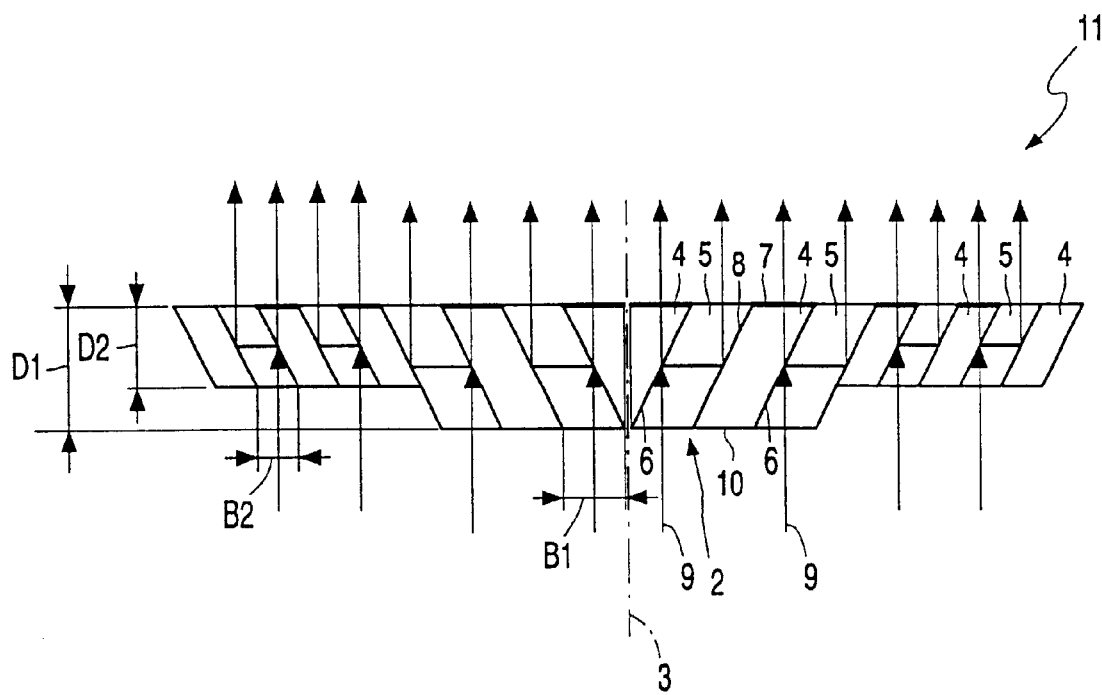
Figure 3:
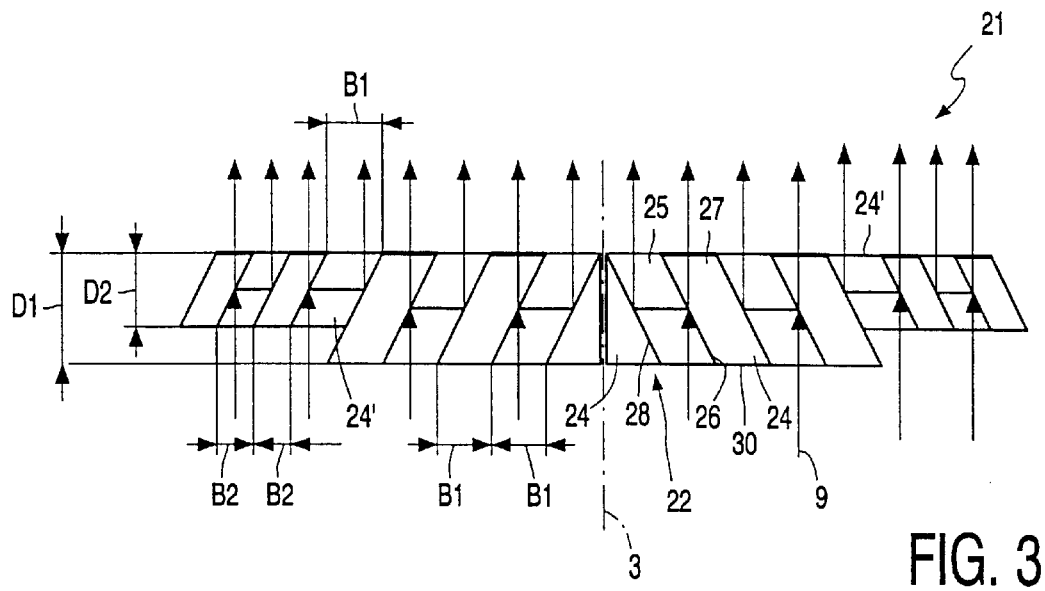
Figure 4:
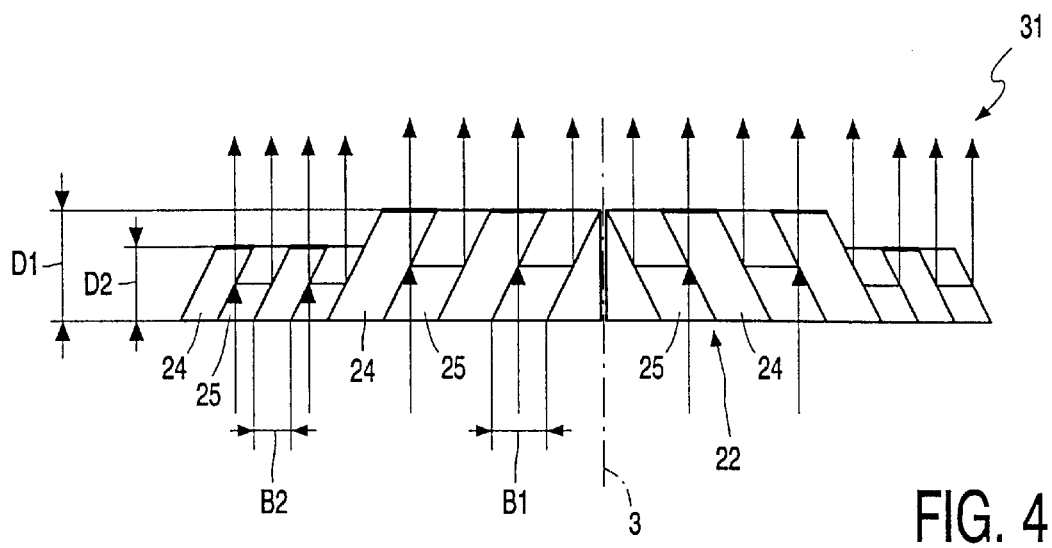
Figure 5:
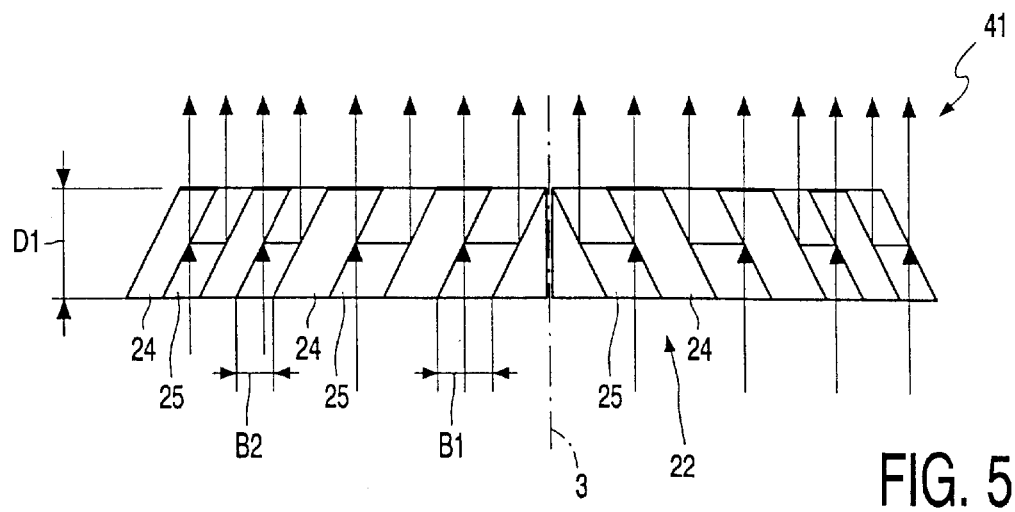

In the drawings:

FIG. 1 shows a first embodiment of the optical element according to the invention, FIG. 2 shows a second embodiment of the optical element according to the invention, FIG. 3 shows a third embodiment of the optical element according to the invention, FIG. 4 shows a fourth embodiment of the optical element according to the invention, FIG. 5 shows a fifth embodiment of the optical element according to the invention.

Corresponding components in the Figures have the same reference numerals.

DETAILED DESCRIPTION

FIG. 1 shows an optical element 1 according to the invention, provided with a plurality of polarization-separating members 2 arranged in a row, which row extends transversely to an optical principal axis 3 of the optical element 1. Each polarization-separating member 2 comprises two light transmissive components 4, 5 which are connected together along a face 6 extending at an angle of 45° to the optical axis 3. The face 6 has a filter which transmits light with a direction of polarization S and reflects light with a direction of polarization P. The optical component 4 is provided with a polarization-converting member 7 such as, for example, a ½λ foil, on a side remote from a light source not shown), with which member the direction of polarization of the light exiting from the optical component 4 is converted from the direction of polarization S into direction of polarization P.

On a side facing the light source on or opposite face 10, the optical component 4 has an opaque layer or a layer which is reflective to a first direction of polarization and a layer which is transmissive to a second direction of polarization.

The component 5 is connected via a face 8 to component 4 of a polarization-separating member 2 arranged next to it, which face 8 has a layer which is reflective to direction of polarization P.

In the optical element 1 of FIG. 1, the polarization-separating members 2 are arranged in a mirrored configuration on both sides of the optical principal axis 3, the interfaces 6, 8 extending along faces intersecting each other on a side facing the light source.

As is clearly apparent from FIG. 1, the optical components 4, 5 of the polarization-separating members 2 located proximate to the optical axis 3 have a width B1 and a thickness D1, while polarization-separating members 2 spaced apart from the optical axis 3 have optical components 4, 5 with a width B2 and a thickness D2 which is smaller than the width B1 and the thickness D1, respectively. An optical component 5' having a width B1 and a thickness D2 is located between the polarization-separating members 2 of widths B1 and thicknesses D1 and polarization-separating members of widths B2 and thicknesses D2.

The component 5 of width B1 located next to the component 5' partly projects beyond the component 5' on a side remote from the light source. By giving the component 5' a larger width, a light beam exiting from the component 5' is obtained which has the same width B2 as the light beam exiting from the juxtaposed component 5.

Due to the smaller width B2, the optical axes 9 of the polarization-separating members 2 located on the outer side of the optical element 1 are located closer together than the optical axes 9 of the polarization-separating members 2 located proximate to the optical principal axis 3.

In the optical element 1 shown in FIG. 1, the side facing the light source is entirely flat so that the optical element 1 can be easily secured to another optical component such as, for example, an integrator plate 2.

An unpolarized light beam with optical axis 9, coming from the light source and incident on the polarization-separating member 2, is split on the face 6 into transmissive light with a direction of polarization S and reflective light with a direction of polarization P and deflected through 90°. The transmissive light with a direction of polarization S is converted by the polarization-converting member 7 into light with a direction of polarization P. The light reflected by the face 6 is deflected through 90° again on the interface 8 and leaves the optical component 5 with an unchanged direction of polarization P.

It is of course also possible to convert light beams in this way into light with a direction of polarization S.

FIG. 2 shows another embodiment of an optical element 11 according to the invention, which is different from the optical element 1 in that the polarization-separating members 2 with a width B2 and a thickness D2 are directly connected to the polarization-separating members with width B1 and thickness D1. Furthermore, the optical components 4, 5 are co-planar on a side remote from the light source.

FIG. 3 shows a further embodiment 21 of the optical element according to the invention, provided with polarization-separating members 22 with optical components 24, 25 separated by an interface 26 and connected by means of interfaces 28 to juxtaposed polarization-separating members 22. The interfaces 26, 28 are provided with the same materials as the faces 6, 8. The optical component 24 is provided with a polarization-converting member 27 on a side remote from the light source, which member corresponds to the polarization-converting member 7. The difference between the polarization-separating member 22 and the polarization-separating member 2 is that the interfaces 26, 28 of the polarization-separating members 22 located on both sides of the optical principal axis 3 intersect each other on a side remote from the light source, so that a better light distribution is obtained around the optical principal axis 3.

The polarization-separating members 22 located proximate to the optical axis 3 have a width B1 and a thickness D1 which is larger than the width B2 and thickness D2 of polarization-separating members 22 spaced apart from the optical axis 3. On both sides of the optical principal axis, a component 24' having a width B1 and a thickness D2 is located between these two groups of polarization-separating members 22. The optical components 24, 25 are co-planar on a side remote from the light source.

FIG. 4 shows a further embodiment of an optical element 31 according to the invention, which is different from the optical element 21 shown in FIG. 4 in that the optical components 24, 25 are co-planar on a side facing the light source, while, moreover, the optical component 24' is absent.

FIG. 5 shows a further embodiment of an optical element 41 according to the invention, in which all optical components 24, 25 have the same thickness D1, while B1 is the width of the components 24, 25 located proximate to the optical principal axis 3 and B2 is the width of the components 24, 25 remote from the optical principal axis 3. Such an optical element 41 can be manufactured in a relatively easy manner.

The choice of optical elements 1, 11, 21, 31 or 41 depends on the desired applications in which, for example, a single flat side on a side facing the light source or remote from the light source is desired.

The optical element according to the invention is suitable, inter alia, for use in an LCD projector provided with a light source, a light modulation panel and two interpositioned integrator plates, in which light beams exiting from the integrator plates proximate to the optical principal axis 3 are spaced farther apart than they are spaced apart from the optical principal axis 3.

It is of course also possible to use polarization-separating members having more different widths instead of polarization-separating members having two different widths B1, B2.

It is alternatively possible for the polarization-separating members 21 to extend circularly around the optical axis 3, with the width of the polarization-separating members decreasing in the radial direction.

It is alternatively possible that the interfaces 6, 8, 26, 28 extend parallel to each other on both sides of the principal axis 3.

What is claimed is:

1. An optical element suitable for separating and converting directions of polarization, comprising polarization-separating members arranged in a row extending transversely to an optical principal axis of the optical element, including polarization-separating members located proximate to the optical principal axis and polarization-separating members spaced apart from the optical principal axis, for separating incident light from a light source into transmissive light having a first linear direction of polarization and reflective light having a second linear direction of polarization which is orthogonal to the first direction of polarization-on a side facing the light source, said polarization-separating members having faces extending at an angle to the optical principal axis, and each polarization-separating member having a thickness in the direction of the optical principal axis and a width in a direction transverse to the optical principal axis, the optical element being further provided with polarization-converting members located on a side of the polarization-separating members remote from the light source for converting the first or the second direction of polarization into the second or the first direction of polarization, said polarization-separating members located proximate to the optical principal axis having a different width than said polarization-separating members spaced apart from the optical principal axis, the optical axes of the polarization-separating members located proximate to the optical principal axis being located at a different distance from each other than the optical axes of the polarization-separating members spaced apart from the optical principal axis, and said polarization-separating members located proximate to the optical principal axis having a larger thickness than polarization-separating members spaced apart from the optical principal axis.

2. An optical element as claimed in claim 1, characterized in that the polarization-separating members located proximate to the optical principal axis have a larger width than the polarization-separating members spaced apart from the optical principal axis.

3. An optical element as claimed in claim 1, characterized in that all polarization-separating members have the same thickness.

4. An optical element as claimed in claim 1, characterized in that at least a third polarization-separating member having a width which is equal to the width of the first polarization-separating members and a thickness which is equal to the thickness of the second polarization members is arranged between first polarization-separating members located proximate to the optical principal axis and having a relatively large width and thickness and second polarization-separating members spaced apart from the optical principal axis and having a relatively small width and thickness.

5. An optical element as claimed claim 1, characterized in that all polarization-separating members are co-planar on a side facing the light source.

6. An optical element as claimed in claim 1, characterized in that all polarization-separating members are co-planar on a side remote from the light source.

7. An optical element as claimed in claim 1, characterized in that the polarization-separating members located on both sides of the optical principal axis extend alongside each other on faces intersecting each other on a side remote from the light source.

8. An optical element as claimed in claim 1, characterized in that the polarization-separating members located on both sides of the optical principal axis extend alongside each other on faces intersecting each other on a side facing the light source.

9. A projection system provided with a light source, a light modulation panel and an optical element located between the light source and the light modulation panel, as claimed in claim 1.

* * * * *